(12) United States Patent
Wing

(10) Patent No.: US 11,208,809 B2
(45) Date of Patent: Dec. 28, 2021

(54) ROOF

(71) Applicant: Alex Wing, Morris, NY (US)

(72) Inventor: Alex Wing, Morris, NY (US)

( * ) Notice: Subject to any disclaimer, the term of this patent is extended or adjusted under 35 U.S.C. 154(b) by 0 days.

(21) Appl. No.: 16/127,158

(22) Filed: Sep. 10, 2018

(65) Prior Publication Data
US 2019/0078333 A1 Mar. 14, 2019

Related U.S. Application Data

(60) Provisional application No. 62/556,542, filed on Sep. 11, 2017.

(51) Int. Cl.
| | | |
|---|---|---|
| *E04H 15/04* | (2006.01) | |
| *E04D 5/14* | (2006.01) | |
| *E04H 15/00* | (2006.01) | |
| *A01K 1/03* | (2006.01) | |
| *E04F 10/02* | (2006.01) | |

(52) U.S. Cl.
CPC .............. *E04D 5/142* (2013.01); *A01K 1/034* (2013.01); *E04D 5/144* (2013.01); *E04F 10/02* (2013.01); *E04H 15/00* (2013.01)

(58) Field of Classification Search
CPC ....... E04D 5/142; E04D 5/144; E04H 15/005; E04H 15/04; E04H 15/16; E04H 15/18; E04H 15/32; E04H 15/34; E04H 15/40; E04H 15/405; E04B 1/343; E04B 1/344; E04B 1/3442; E04B 1/3444; E04B 1/3445; E04F 10/02
USPC ...................................................... 52/746.1
See application file for complete search history.

(56) References Cited

U.S. PATENT DOCUMENTS

| | | | | |
|---|---|---|---|---|
| 739,024 | A * | 9/1903 | Palmer ................... | E04H 15/04 135/121 |
| 1,650,323 | A * | 11/1927 | Byars ...................... | E04H 15/00 135/116 |
| 2,781,767 | A * | 2/1957 | Blankenship, Jr. ... | E04H 15/003 135/143 |
| 2,890,498 | A * | 6/1959 | Bigelow ............... | E04H 15/008 135/143 |
| 3,016,115 | A * | 1/1962 | Harrison ................. | E04H 1/12 52/18 |
| 3,282,274 | A * | 11/1966 | Scott ....................... | E04H 15/18 135/114 |
| 3,714,749 | A * | 2/1973 | Aitken ................. | E04B 1/34378 52/70 |
| 3,868,295 | A * | 2/1975 | Boone, Jr. ............. | E04B 1/32 428/10 |
| 3,896,830 | A * | 7/1975 | Sharick .................. | E04H 15/10 135/116 |
| 4,115,963 | A * | 9/1978 | Lubov ...................... | E04B 1/32 52/81.4 |
| 4,305,414 | A * | 12/1981 | Bareis ..................... | E04H 15/56 135/116 |
| 4,709,718 | A * | 12/1987 | Nichols .................. | E04H 15/40 135/115 |
| D702,791 | S * | 4/2014 | Jin .............................. | D21/834 |

(Continued)

*Primary Examiner* — Brian E Glessner
*Assistant Examiner* — James J Buckle, Jr.
(74) *Attorney, Agent, or Firm* — Edward T Lentz

(57) ABSTRACT

A roof that comprises a flexible, sun and rain resistant sheet constructed such that when suspended and extended to form the roof, design-integrated rain valleys are formed that channel water to and off the outside edges of the roof.

9 Claims, 4 Drawing Sheets

(56) References Cited

U.S. PATENT DOCUMENTS

| | | | | |
|---|---|---|---|---|
| 8,820,005 | B2* | 9/2014 | Hovsepian | E04H 15/006 |
| | | | | 52/79.5 |
| 9,340,995 | B2* | 5/2016 | Jin | E04H 15/46 |
| 9,845,613 | B1* | 12/2017 | Leu | E04H 15/008 |
| 9,896,862 | B1* | 2/2018 | Cox | E04H 15/28 |
| D847,486 | S  * | 5/2019 | Morel | D3/5 |
| 10,294,691 | B1* | 5/2019 | Goncher | E04H 15/16 |
| 2004/0238021 | A1* | 12/2004 | Holub | E04H 15/18 |
| | | | | 135/97 |
| 2009/0272043 | A1* | 11/2009 | Zwern | E04B 1/34321 |
| | | | | 52/27 |
| 2010/0243015 | A1* | 9/2010 | Danziger | E04H 15/48 |
| | | | | 135/139 |
| 2013/0061898 | A1* | 3/2013 | Webster | E04H 15/008 |
| | | | | 135/156 |
| 2013/0206198 | A1* | 8/2013 | Kouzmanoff | E04H 15/34 |
| | | | | 135/121 |
| 2014/0096805 | A1* | 4/2014 | Silva | E04H 15/10 |
| | | | | 135/91 |
| 2017/0234026 | A1* | 8/2017 | LaHood | E04H 15/18 |
| | | | | 135/97 |
| 2018/0283037 | A1* | 10/2018 | McDonald | E04H 15/04 |

* cited by examiner

ROOF

BACKGROUND OF THE INVENTION

This invention provides a roof that comprises a flexible, sun and rain resistant sheet constructed such that when suspended and extended to form the roof, design-integrated rain valleys are formed that channel rain water to and off the outside edges of the roof during inclement weather. The roof can be used to cover, e.g., a patio or other gathering area or an animal enclosure such as a dog kennel, thereby providing the covered area protection from rain or melting snow, which is directed off the roof by the rain valleys, and also from sunlight.

SUMMARY OF THE INVENTION

This invention provides a roof that can be installed, taken down, and carried manually and that comprises a flexible, sun and rain resistant sheet constructed such that when suspended and extended to form the roof, design-integrated rain valleys are formed that channel rain water to and off the outside edges of the roof during inclement weather.

In illustrative embodiments, this invention provides a foldable, packable, and storable kennel cover that can be installed on an existing kennel to provide a healthy environment for dogs or other animals that is shaded and protected from rain or other precipitation and that can be easily removed.

In an illustrative embodiment, the invention comprises a flexible waterproof sheet for use as a portable, foldable roof for an exterior enclosure comprising three or more triangular sections, wherein each side of each triangular section is joined to the side of an adjacent section such that the vertex angles of each section are joined at about the center of the roof, the base edges of the triangular sections form the outer edge of the sheet;

the length of each base edge of at least two of the triangular sections is greater than an imaginary straight line connecting the two corners of the base edge, such that when the sheet is fully extended the base edge of each of said two or more triangular sections cannot be stretched flat;

there being at least three means for securing the sheet to supports positioned along the base edge, e.g., at each corner of the base edge.

The roof comprising triangular sections is typically polygonal. So, in an illustrative embodiment, the invention comprises such roof that comprises four or six triangular sections and that is a square or an oblong rectangle, with means for securing the sheet to supports at each corner of the sheet and, typically, means for securing the rain valleys to supports as well.

In illustrative embodiments, the sheet comprises a reinforcing strip on the diagonal lines on which the sides of the triangular sections are joined so as to reduce stretching and sagging of the diagonals and the center of the sheet when the sheet is fully extended and suspended by the securing means in each corner of the sheet.

In illustrative embodiments, each edge of each triangular section is two to eight inches longer than the distance between each corner of the sheet when the sheet is fully extended.

In illustrative embodiments, the center of the sheet is below the plane of the corners of the sheet, e.g., 0 to 8 inches below said plane of the corners, e.g., 1 to 6 inches below or 2 to 4 inches below, but the center is of course higher than the low points of the rain valleys.

In illustrative embodiments, there are additional support means, one in about the center of each edge of each side of the sheet, which serve to hold the low points of the rain valleys securely to support means and thereby to secure the shape of the rain valleys.

A particular illustrative embodiment of the invention is the flexible waterproof sheet for use as a portable, foldable roof for an exterior enclosure comprising four triangular sections depicted in FIG. 3 comprising means for securing the sheet to corner supports in each of corner (107), corner (108), corner (109), and corner (110) and means for securing the sheet to edge supports in about the center of each edge (107-108, 108-109, 109-110, and 110-107) wherein when the sheet is extended and suspended by all eight securing means:

corners (107, 108, 109, and 110) are substantially on the same plane and the center of the sheet is below said plane of the four corners, e.g., 0 to 8 inches below said plane of the four corners, e.g., 1 to 6 inches below or 2 to 4 inches below, but is of course higher than the low points of the rain valleys;

each of edges (107-108, 108-109, 109-110, and 110-107) of the sheet are longer than straight lines extending from each of corner (107) to corner (108), corner (108) to corner (109), corner (109) to corner (110), and corner (110) to corner (107);

the four edge supports in about the center of each edge are substantially on the same plane, which plane is lower than the center of the sheet and is about six to 30 inches lower than the plane of corners (107, 108, 109, and 110), e.g., nine to 28 inches below.

Another particular illustrative embodiment of the invention is the flexible waterproof sheet for use as a portable, foldable roof for an exterior enclosure comprising four or six triangular sections depicted in FIG. 4 comprising means for securing the sheet to perimeter supports in each of corner (7), corner (8), corner (9), and corner (10);

means for securing the sheet to edge supports in about the center of each edge (11/12), edge (19), edge (13/14), and edge (17) wherein when the sheet is extended and suspended by all eight securing means:

corners (7, 8, 9, and 10) are substantially on the same plane and the center of the sheet is 0 to 8 inches below said plane of the four corners, e.g., 1 to 6 inches below or 2 to 4 inches below;

each of edges (11/12, 19, 13/14, and 20) of the sheet are longer than straight lines extending from each of corner (7) to corner (8), corner (8) to corner (9), corner (9) to corner (10), and corner (10) to corner (7), the four or six triangular sections being indicated in FIGS. 4 as (1/2, 3, 4/5, and 6) or (1, 2, 3, 4, 5, and 6);

the four edge supports in about the center of each edge are substantially on the same plane, which plane is lower than the center of the sheet and is about six to 30 inches lower than the plane of corners (107, 108, 109, and 110), e.g., nine to 28 inches below.

DESCRIPTION OF THE INVENTION

Figure 1:
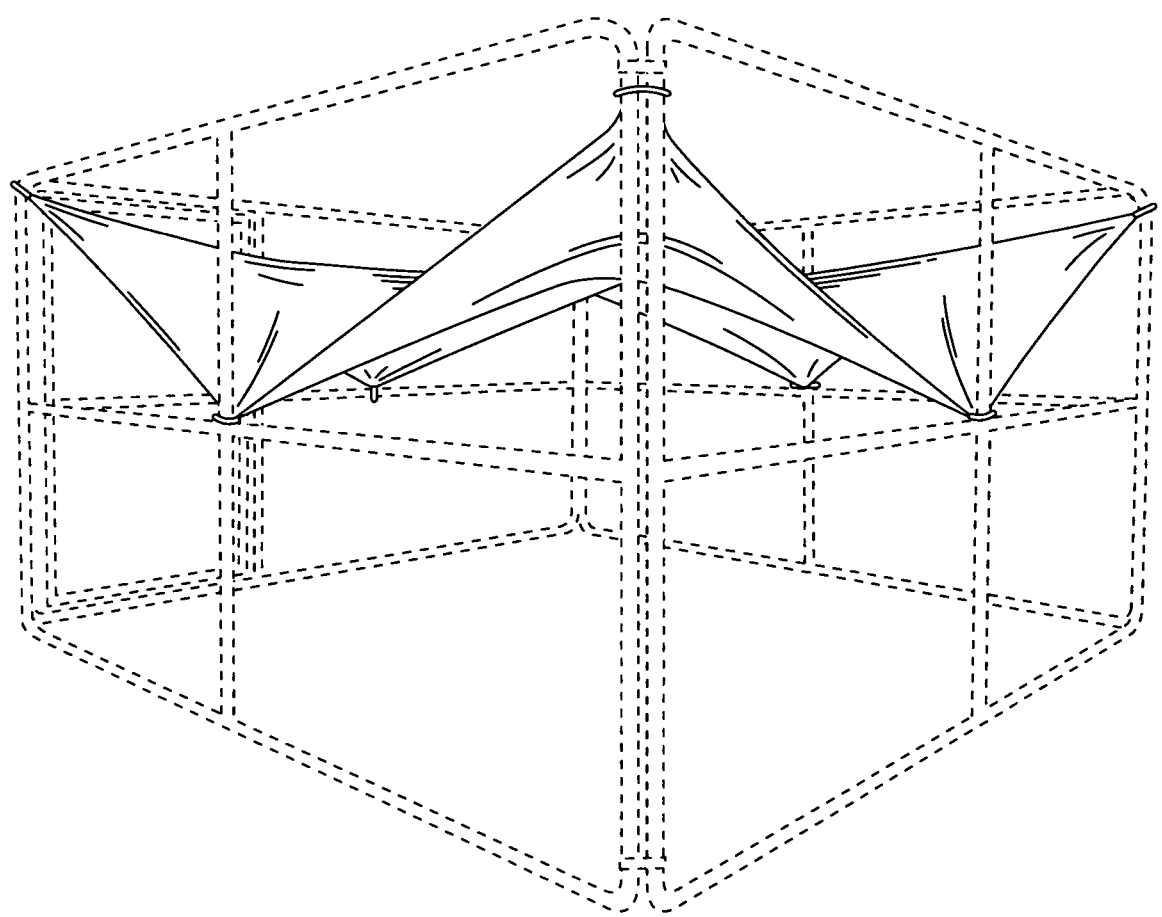
FIG. 1 is a photo of a square-shaped roof of the invention extended and suspended over a dog kennel.

An illustrative embodiment of the invention is shown in FIG. 1, which is of a square-shaped roof of the invention. The roof of this illustrative embodiment comprises a sheet formed from sections of sheet material such that, as can be seen in FIG. 1, when the sheet is extended and suspended, it forms a roof with corners suspended more or less on the same plane as diagonal ridge lines and with rain valleys running from the center of the roof outwardly and downwardly to the edges of the roof approximately midway between the corners.

The aforementioned rain valleys are integrated into the device by designing the device to be comprised of joined discreet sections, each of which emanates more or less from the center of the device and is joined along its sides to two other sections. Each section has an outer edge such that the sum of the lengths of all outer edges is greater than the perimeter of the device, i.e., greater than the perimeter of the covered area or, for example, with reference to FIG. 1, greater than the perimeter of the area within the kennel fences, or, with reference to FIG. 3, greater than the sum of distances (107-108)+(108-109)+(109-110)+(110-107). The angle of each of the sections where they are joined at about the center of the device can be referred to as the vertex angle.

Figure 3:
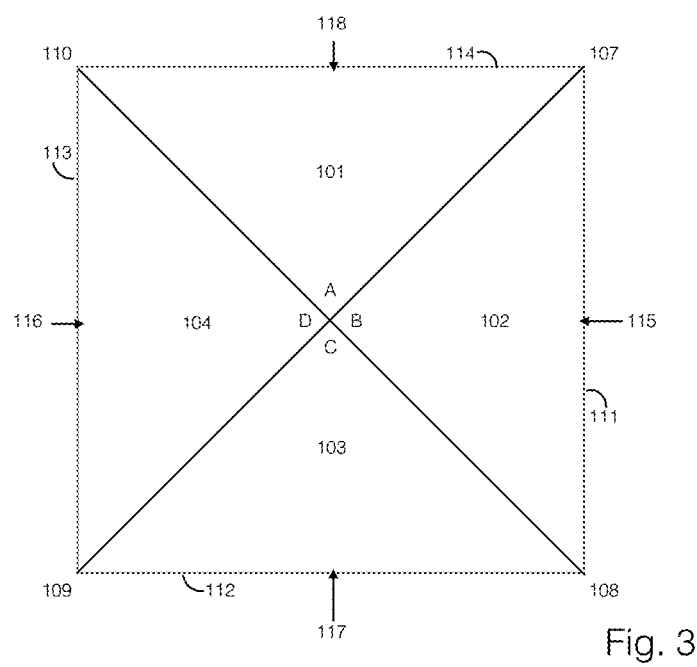
FIG. 3 illustrates a square-shaped roof of the invention.

In the illustrative embodiment depicted in FIG. 1 and illustrated in FIG. 3, the roof is square, i.e., the four corners (107, 108, 109, 110) form a square when extended on a single plane, and comprises a flexible sun-blocking and waterproof sheet comprising 4 more or less right triangular sections (101, 102, 103, 104). FIG. 3 shows these as right triangles because when in use as shown in FIG. 1 ridge lines 107-109 and 108-110 form four 90 degree angles (A, B, C, D), i.e., vertex angles. However, as explained below, in each section, angles A, B, C, and D are effectively greater than 90 degrees because each edge (111, 112, 113, 114) is longer than it would be if each angle (A, B, C, D) were ninety degrees and each corner angle was 90 degrees (i.e., 180 degrees per triangular section (101, 102, 103, 104)).

The sections (101, 102, 103, 104) are joined along their sides such that the four more or less triangular sections (101, 102, 103, 104) are joined at their vertex angles (A, B, C, D) in the center of the square. The sides of all sections are of the same length. The bases (i.e., hypotenuses) (111, 112, 113, 114) of the sections form the outer edges of the device, each of the four bases forming one of the four sides of the roof. If the sheet itself were actually square, each triangular section would be an isosceles triangle, the vertex angle of each section would be 90 degrees, and the two remaining angles, i.e., the base angles, of each triangular section would be 45 degrees. In this way, the sum of the lengths of the bases would be equal to the perimeter of the square and the square sheet would lie perfectly flat, i.e., when the corners are extended on a single plane, the entire sheet would be more or less on that plane.

Figure 2:
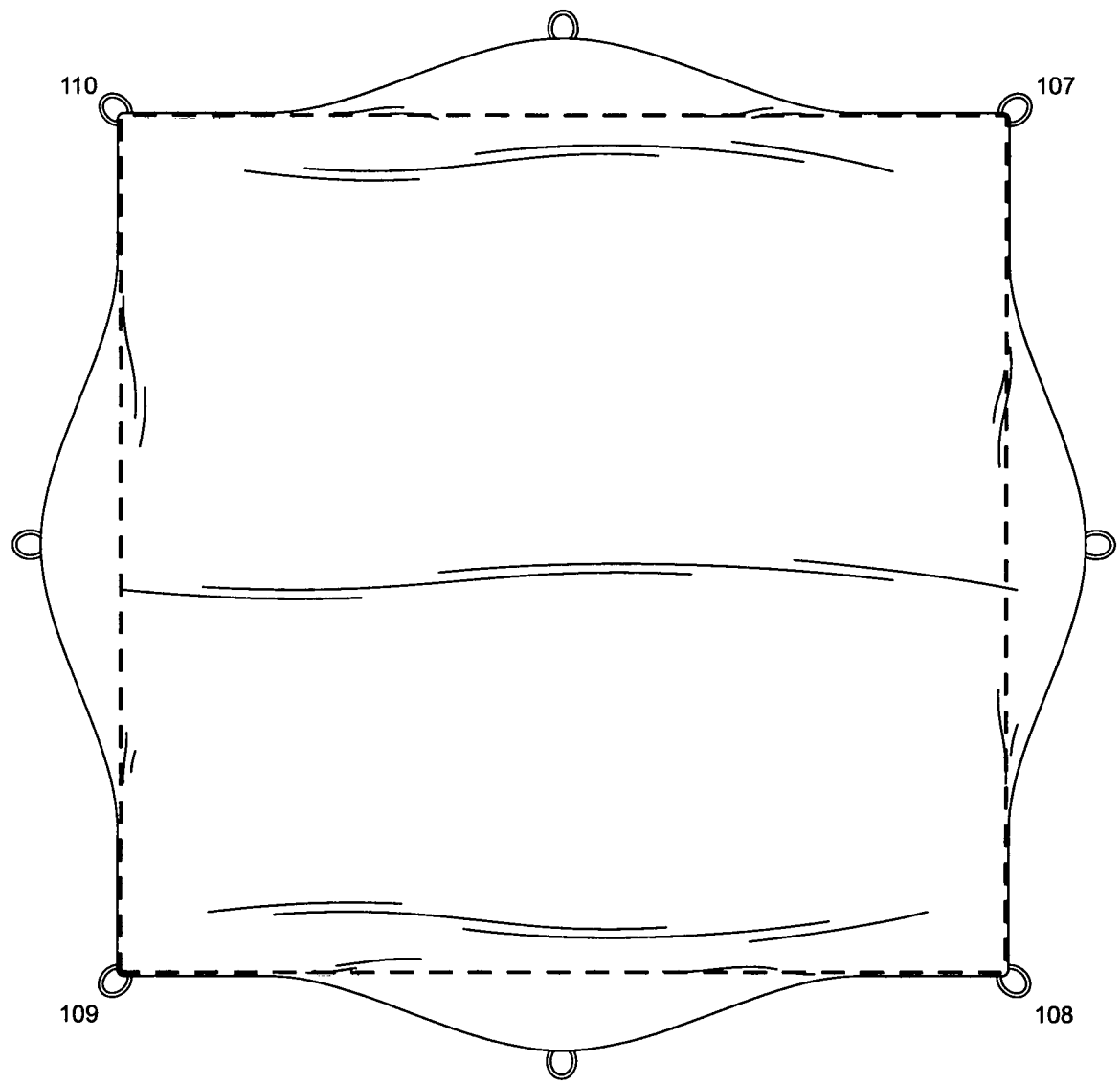
FIG. 2 is a photo of a square-shaped roof of the invention extended and laid on the ground. The dashed lines connecting the corners (107-108, 108-109, 109-110, 110-107) are imaginary straight lines illustrating the straight line distances between said corners and, in this illustration, forming an imaginary square.

However, in this illustrative device of the invention, the sum of the lengths of the four base edges is greater than the perimeter of the imaginary square formed by extending the four corners. Because the base edges are longer than the distance between the corners, they sag, thereby forming the design-integrated rain valleys. As can be seen in FIG. 1 and FIG. 2, when the four corners are extended, the device of the invention cannot lie flat.

The length of the edges need not be very much longer than the straight lines extending from corner to corner along the perimeter of the roof when extended and supported. For example, with reference to FIG. 3, if the straight line distance from corner (107) to corner (108), from corner (108) to corner (109), from corner (109) to corner (110), and from corner (110) to corner (107) is 120 inches, the length of edges (107-108), (108-109), (109-110) and (110-107) can be 124 inches, which would cause the edge of each integrated rain valley to be about 15-½ inches below the corners. Thus, the length of each edge is generally only about 2% to about 15%, e.g., about 3% to about 12%, longer than the straight line distance between the corners. So, for example, for an 8'×8' kennel roof, each edge of the sheet could be 98" to 110 inches, which would create integrated rain valleys that at each edge would be about 9-½ inches to about 27 inches below the corners.

Another way to describe this illustrative embodiment is to state that the vertex angles (A, B, C, D) are each greater than 90 degrees, such that the sum of the four angles (A, B, C, D) is greater than 360 degrees. As a result, when the four corners of the device are suspended and fully extended so as to form the corners of a square, the joined sides of all four sections are stretched taut but the base edges sag, thereby forming one of the aforesaid design-integrated valleys on each side of the square. These rain valleys channel rainwater from the center of the device to the edges and off the sheet approximately at locations (115, 116, 117, and 118).

The design-integrated rain valleys can be seen in the photograph of FIG. 1, which shows a roof of the invention extended and suspended over a dog kennel.

The height of the roof of the invention can be adjusted by securing the device at higher or lower heights, such as to accommodate smaller or larger animals, thereby providing optimized protection from sun and precipitation. In any event, water on the roof will exit off the roof in one or more defined areas, thereby protecting the covered area from precipitation and avoiding runoff into the covered area.

While channeling of rain water from a roof comprising a flat sheet such as a tarpaulin is possible, rain channels formed in a flat sheet will not be angled towards the outer edges of the sheet such that the water flows towards the edges, unless the center of the sheet is supported at an elevated position, such as by a horizontal pole, a vertical pole, or an overhead support. Without such interior support, the center of the sheet will also sag. In the device of the invention, the center of the device is on or, due to sagging, slightly below the plane of the four corners, without the need for interior support (i.e., support at locations other than the edges/corners of the device). Having design-integrated rain valleys permits the formation of valleys without the need for interior supports, employing, instead, only perimeter supports, such as in each of the four corners of a square roof of the invention.

In the case of an illustrative square roof of the invention, each of the four corners preferably comprises a means for attachment to a supporting structure. The supporting structures can be, e.g., posts, walls, fencing, trees, etc., such as the four corner posts of a dog kennel. The attachment means can be as simple as a reinforced hole, e.g., a ring or grommet, in each corner so that the corners can be tied, e.g., with zip ties, string, rope, webbing, come alongs, or cables, to a supporting structure (e.g., a kennel corner post), or secured by a fastener, preferably a quick release fastener, e.g., a hook, quick link, carabiner, hook and loop fastener, or a lead (or leash) clip. Other useful attachment means include, e.g., string, rope, webbing, or cable attached to each corner and having a hole, quick release fastener, or hook and loop fastener, or a lead (or leash) clip, or the like, attached to its end, or being looped back to the sheet.

Preferably, a roof of the invention comprises further attachment means along the edges between the points of attachment for suspension. For example, in the case of a square roof of the invention, each base of the triangular sections can have attachment means on the edge approximately half way between the corners. Such attachment means along the edges (i.e., edge attachment means) allows for the device to be secured such that the edges do not flap in the breeze or bend under the weight of rain water or snow.

In an illustrative embodiment such as is illustrated by FIG. 3, each corner (107, 108, 109, 110) is attached to vertical supports, e.g., kennel fence corner posts, of a 10 feet×10 feet enclosure; each edge (111, 112, 113, 114) is approximately 10 feet two inches long to approximately 10 feet 8 inches long, e.g., 10 feet four inches long. The center of the roof is 1 to 6 inches below the plane of the four corners, e.g., 2 to 4 inches below. Stretching of the roof material can be minimized by attached a less stretchable ribbon, e.g., woven webbing, or other materials such as a rope or cable, along the diagonal ridge lines (107-109 and 108-110).

With this description of a simple square device of the invention, one can readily understand that the invention is not limited to a square roof. The roof can be any polygonal shape, e.g., triangular, rectangular, or irregular, e.g., rhomboidal or trapezoidal, or it can have a curved or curvey edge, e.g., a circle, an oval, or a portion of a circle or oval such as, e.g., a triangular section have straight sides a rounded edge. Whatever the shape of the roof, it is comprised of sections each having an outside edge, the sum of the lengths of which is greater than the perimeter of the shape formed on the plane of the points at which the device is suspended, such that the edges between these points sag to form rain valleys that channel water towards the edges of the device.

Figure 4:
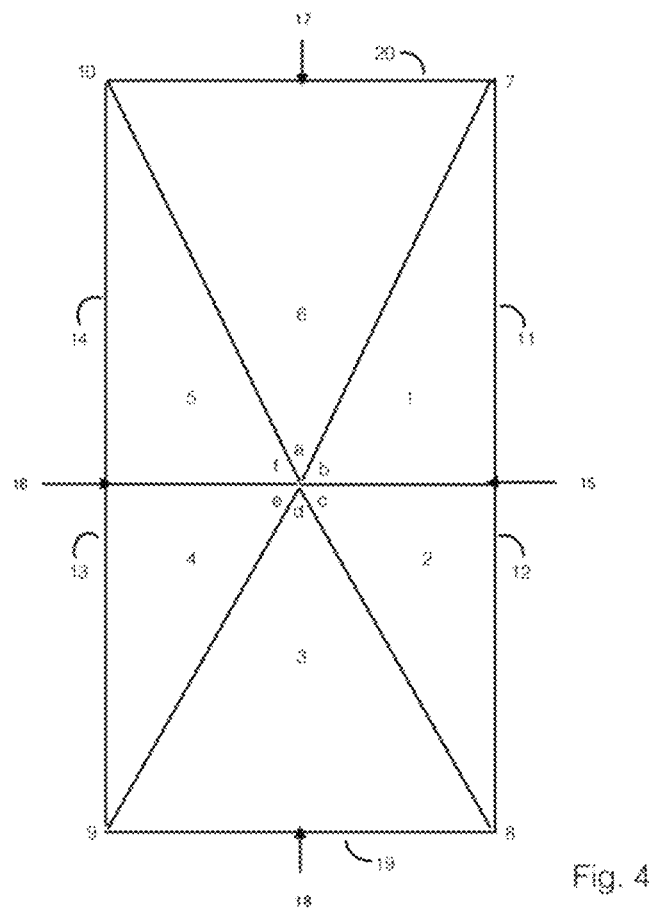
FIG. 4 illustrates a non-square, rectangular-shaped roof of the invention.

Another illustrative embodiment of the invention is rectangular and is illustrated in FIG. 4. It comprises 6 more or less triangular sections (1, 2, 3, 4, 5, 6), two forming each of the longer sides and one forming each of the shorter sides. In such illustrative embodiment, the shorter sides can be as described above with respect to the square illustrative embodiment. The two on each longer side can each be a right triangle, more or less, joined to the other along one of the sides that forms the ~90 degree angle, the other side forming the ~90 degree angle can form the outer edge of the device and the hypotenuse can be joined to the side of one of the triangles forming the shorter portion of the device. The device can be suspended and extended using attachment means at each corner (7, 8, 9, 10). In such extended state, the four corners (7, 8, 9, 10) are more or less on the same plane. The length of edge (11-12) of the device, and the length of edge (13-14) of the device, are greater than the length of lines (7-8) and (9-10) when the device is extended. Similarly, the length of edge (20) of the device, and the length of edge (19) of the device, are greater than the length of lines (10-7) and (9-8). The sum of angles (a, b, c, d, e, and f), therefore, is greater than 360 degrees.

Thus sides (11-12) and (14-13) sag, as do sides (19) and (20), when the device is extended and suspended using attachment means at about location (7, 8, 9, and 10). Additional attachment means can be placed on these sides at about locations (15, 16, 17, and 18 and said attachment means can be used to secure the device to a support on a plane that is lower than the plane (7, 8, 9, 10). In this way, four integrated rain valleys are formed with troughs channeling water off the device at about locations (15, 16, 17, and 18) and said attachment means can be used to secure the device to a support on a plane that is lower than the plane (7, 8, 9, 10).

In this way, four integrated rain valleys are formed with troughs channeling water off the device at about locations 15, 16, 17, and 18.

Alternatively, for example, the attachment means at about locations (15 and 16) can be secured on about the same plane as plane (7, 8, 9, and 10) and and attachment means can be placed about halfway between (7) and (15), (15) and (8), (9) and (16), and (16) and (10), thereby forming six integrated rain valleys when the device is extended and suspended.

In another variant, the sheet of FIG. 4 can comprise four triangular sections, e.g., (1+2), (3), (4+5), and (6).

In an illustrative embodiment, the device of the invention is a removable kennel roof wherein each corner of the device can be attached to the corners of the kennel at or near the top of the kennel, and each edge of the device can be attached to the walls of the kennel at a height that is lower than the points of attachment of the corners. Such kennel roof can be raised or lowered, if desired, e.g., to reduce the distance from the roof to the kennel floor thereby providing a greater degree of protection from rain (or sunlight) that would otherwise reach the kennel from the sides. Each valley formed by having the edges attached at a height lower than the point of attachment of the corners provides a design-integrated valley to provide animal comfort in rainy conditions. The roof is flexible, meaning it can be folded up or rolled for ease of carrying or storing.

In particular illustrative embodiments of the invention, the roof comprises a flexible waterproof sheet comprising three or more triangular sections, wherein each side of each triangular section is joined to the side of an adjacent section, the base edges of the triangular sections form the outer edge of the sheet;

the length of each base edge of at least two of the triangular sections is greater than an imaginary straight line connecting the two corners of the base edge, such that when the sheet is laid flat or stretched flat the base edge of each of said two or more triangular sections cannot lie flat or be stretched flat;

there being means for securing the sheet to supports positioned along the base edge at least in the area where each triangular section is joined to another triangular section and optionally also at about the center of the base edge of each triangular section.

Benefits of the roof of the invention include, among others, that it is self-supporting in that it can be extended and suspended by attachment means proximate to the edges of the device (i.e., perimeter supports) with no interior supporting means needed; has variable height adjustment; provides a defined water exit; can be quickly and easily installed and removed; and is portable and foldable for storage.

The sheet material is any flexible (i.e., foldable and rollable), durable sheet that is water resistant such that it at least partially blocks rainwater or water from melting snow, sleet, or hail. The sheet may also be opaque such that it at least partially blocks sunlight. Materials used, e.g., for roof tarps will generally be suitable for the roof of the invention.

In certain embodiments, the material is reversible such that one side can be used to deflect heat from sunlight so as to have a cooling effect on the covered area and the reverse side can be used to absorb heat from sunlight so as to have a warming effect on the covered area.

The flexible sheet can be prepared, e.g., by extrusion, molding, or weaving of various non-permanently deformable polymers or co-polymers of, e.g., acrylics, polyesters, silicones, or polyurethanes. Useful polymers or co-polymers include, e.g., cellulosic polymers, polyethylenes, polyamides, vinyls such as but not limited to polyvinyl chlorides, and polytetrafluoroethylenes. The sheet may contain other components commonly used in plastics, e.g., plasticizers and slip additives. The sheet can be made of other materials, e.g., foils or wovens. The sheet preferably is, or is coated with, a material that is substantially water impermeable such that rainwater or melted snow, sleet, or hail will flow with gravity with minimal or no permeation through the material. Preferably, the sheet does not become brittle at low temperatures so that it can be used during cold weather.

The size of the roof is not critical except that it is dependent on being able to extend it at the points of attachment while maintaining the points of attachment and the center of the device on approximately the same plane. The size of a covered area is typically about 20 to about 30 square feet (e.g., 5'×5' or 6'×4') to about 100 to about 225 square feet (e.g., 10'×10', 12'×12', 15'×15' or 10'×20'). Each edge of a rectangular roof of the invention will typically be at least about two inches longer, preferably about four inches per 10 feet, than the length of the relevant side of the area covered, and the difference in the height to the upper attachment points and the valley attachment points is typically between about four inches and about 18 inches.

The invention also provides a method of affixing a roof of the invention to a supporting structure to form a roof with design-integrated rainwater valleys, wherein the roof comprises a flexible waterproof sheet comprising discreet sections, each of which emanates more or less from the center of the device and is joined along its sides to other sections, each section having an outer edge such that the sum of the lengths of all outer edges is greater than the perimeter of the device, said method comprising attaching the edges of the sheet to the supporting structure at approximately the same height.

The invention claimed is:

1. A flexible waterproof sheet for use as a portable, foldable roof in the shape of a square or oblong rectangle for an exterior enclosure comprising four or six triangular sections, wherein
   each side of each of the four or six triangular sections is joined to the side of an adjacent triangular section of the four or six triangular sections such that the vertex angles of each section of the four or six triangular sections are joined at about the center of the foldable roof,
   the base edges of each of the four or six triangular sections form the outer edges of the flexible waterproof sheet;
   the length of each base edge of the four or six triangular sections is greater than an imaginary straight line connecting the two corners of each edge, such that when the flexible waterproof sheet is fully extended the base edge of each of said four or six triangular sections cannot be stretched flat and a design-integrated rain valley is formed in each of said two or more triangular sections that channels rain water to and off the outside edges of the foldable roof during inclement weather;
   there being at least four means for securing the flexible waterproof sheet to supports positioned along each edge, one of each of said four means for securing the flexible waterproof sheet being in each of the the four corners of the flexible waterproof sheet,
   wherein said flexible waterproof sheet lacks means for providing interior support.

2. The flexible waterproof sheet of claim 1 that is square and has four triangular sections.

3. The flexible waterproof sheet of claim 1 that is an oblong rectangle.

4. The flexible waterproof sheet of claim 1 comprising a reinforcing strip on the sides of the four or six triangular sections that are joined to each other so as to reduce stretching and sagging of the diagonals and the center of the flexible waterproof sheet when the flexible waterproof sheet is fully extended and suspended by the means for securing the flexible waterproof sheet in each corner of the flexible waterproof sheet.

5. The flexible waterproof sheet of claim 1, wherein each edge of each of the four or six triangular sections is two to eight inches longer than the distance between each corner of the flexible waterproof sheet when the flexible waterproof sheet is fully extended.

6. The flexible waterproof sheet of claim 1 wherein the center of the flexible waterproof sheet is 0 to 8 inches below the plane of the four corners when the flexible waterproof sheet is fully extended and suspended.

7. The flexible waterproof sheet of claim 1, further comprising additional means for securing the flexible waterproof sheet to supports, one in about the center of each edge of each side of the flexible waterproof sheet, which serve to hold the low points of the rain valleys securely to support means and thereby to secure the shape of the rain valleys.

8. A flexible waterproof sheet for use as a portable, foldable roof in the shape of a square for an exterior enclosure comprising four triangular sections (101, 102, 103, 104) and further comprising means for securing the flexible waterproof sheet to corner supports in each of the four corners of the square sheet (corner (107), corner (108), corner (109), and corner (110)) and means for securing the flexible waterproof sheet to edge supports in about the center of each of the four edges of the square sheet ((107-108), (108-109), (109-110), and (110-107)) wherein when the flexible waterproof sheet is extended and suspended by all of the eight means for securing the flexible waterproof sheet:
   the four corners (107, 108, 109, and 110) are substantially on the same plane and the center of the flexible waterproof sheet is 0 to 8 inches below said plane of the four corners;
   each of the four edges (107-108, 108-109, 109-110, and 110-107) are longer than straight lines extending from each of the four corners to the next one of the four corners (corner (107) to corner (108), corner (108) to corner (109), corner (109) to corner (110), and corner (110) to corner (107));
   the four edge supports in about the center of each of the four edges are substantially on the same plane, which plane is lower than the center of the flexible waterproof sheet and is about six to 30 inches lower than the plane of the four corners (107, 108, 109, and 110)
   wherein a design-integrated rain valley is formed in each of said four triangular sections that channels rain water to and off the four edges during inclement weather and wherein said flexible waterproof sheet lacks interior supports.

9. A flexible waterproof sheet for use as a portable, foldable roof in the shape of an oblong rectangle for an exterior enclosure comprising four or six triangular sections (1/2, 3, 4/5, and 6) or (1, 2, 3, 4, 5, and 6) and further comprising means for securing the flexible waterproof sheet to perimeter supports in each of the four corners of the rectangular flexible waterproof sheet (corner (7), corner (8), corner (9), and corner (10)) and means for securing the flexible waterproof sheet to edge supports in about the center of each of the four edges ((11/12), edge (19), edge (13/14), and edge (17)) of the rectangular sheet
    wherein when the flexible waterproof sheet is extended and suspended by all of the eight means for securing the flexible waterproof sheet:
    the four corners (107, 108, 109, and 110) are substantially on the same plane and the center of the flexible waterproof sheet is 0 to 8 inches below said plane of the four corners;
    each of the four edges (11/12, 19, 13/14, and 17) are longer than straight lines extending from each of the four corners to the next one of the four corners (corner (7) to corner (8), corner (8) to corner (9), corner (9) to corner (10), and corner (10) to corner (7));
    the four edge supports in about the center of each of the four edges are substantially on the same plane, which plane is lower than the center of the flexible waterproof sheet and is about six to 30 inches lower than the plane of the four corners (107, 108, 109, and 110)
    wherein a design-integrated rain valley is formed in each of said four or six triangular sections that channels rain water to and off the four edges of the foldable roof during inclement weather and
    wherein said flexible waterproof sheet lacks interior supports.

* * * * *